United States Patent [19]

Keller et al.

[11] Patent Number: 4,773,867
[45] Date of Patent: Sep. 27, 1988

[54] PREMISE DISTRIBUTION CROSS CONNECT APPARATUS

[75] Inventors: Steven T. Keller, Lewisville; Anthony L. Rossi, Clemmons, both of N.C.

[73] Assignee: AMP Incorporated, Harrisburg, Pa.

[21] Appl. No.: 96,301

[22] Filed: Sep. 9, 1987

Related U.S. Application Data

[63] Continuation of Ser. No. 881,534, Jul. 2, 1986, abandoned.

[51] Int. Cl.$^4$ .............................. H05K 5/00
[52] U.S. Cl. .............................. 439/49; 379/325; 439/532
[58] Field of Search ............ 339/17 M, 17 LM, 17 C, 339/18 R, 18 C; 361/412, 413, 415, 416, 427, 428, 395, 399; 439/49, 532; 379/325-329

[56] References Cited

U.S. PATENT DOCUMENTS

| | | | |
|---|---|---|---|
| 3,184,645 | 5/1965 | Schaeffer | 361/412 |
| 3,541,396 | 11/1970 | Cardwell et al. | 361/412 |
| 3,771,101 | 11/1973 | Elkins | 361/413 |
| 4,048,669 | 9/1977 | Bowler et al. | 361/415 |
| 4,135,226 | 1/1979 | Kourimsky | 339/17 LM |
| 4,221,445 | 9/1980 | Fleischhacker et al. | 339/18 R |
| 4,335,929 | 6/1982 | Abernathy | 339/18 R |
| 4,471,898 | 9/1984 | Parker | 361/399 |
| 4,536,052 | 8/1985 | Baker et al. | 339/126 R |
| 4,595,799 | 6/1986 | Krob et al. | 361/428 |
| 4,662,701 | 5/1987 | Lane | 339/176 M |
| 4,712,232 | 12/1987 | Rodgers | 379/329 |

OTHER PUBLICATIONS

AMP-Undercarpet Data Cable & Modular Telephone System, Catalog 82-675, pp. 1, 8, 9, 12-1985.

*Primary Examiner*—Neil Abrams
*Attorney, Agent, or Firm*—Robert W. Pitts

[57] ABSTRACT

A premise distribution system employing a number of separate interconnection modules to selectively join communications equipment throughout a building to incoming communication circuits located at an entrance location is disclosed. Each interconnection module is mounted on a rigid board. Interconnection modules employing cross connect members and circuit interconnection members are mounted on a printed circuit board with the traces joining the cross connect and circuit interconnection members. Single line assignment miniature ribbon connector cross connect means can be employed with either modular telephone jacks or barrel terminal contact elements. Selective interconnections can be made in a primary closets or in satellite closets within a facility. The modular interconnection modules can be inserted on mounting plates for attachment to conventional brackets to facilitate installation of the interconnection modules used to form this premise distribution system.

7 Claims, 9 Drawing Sheets

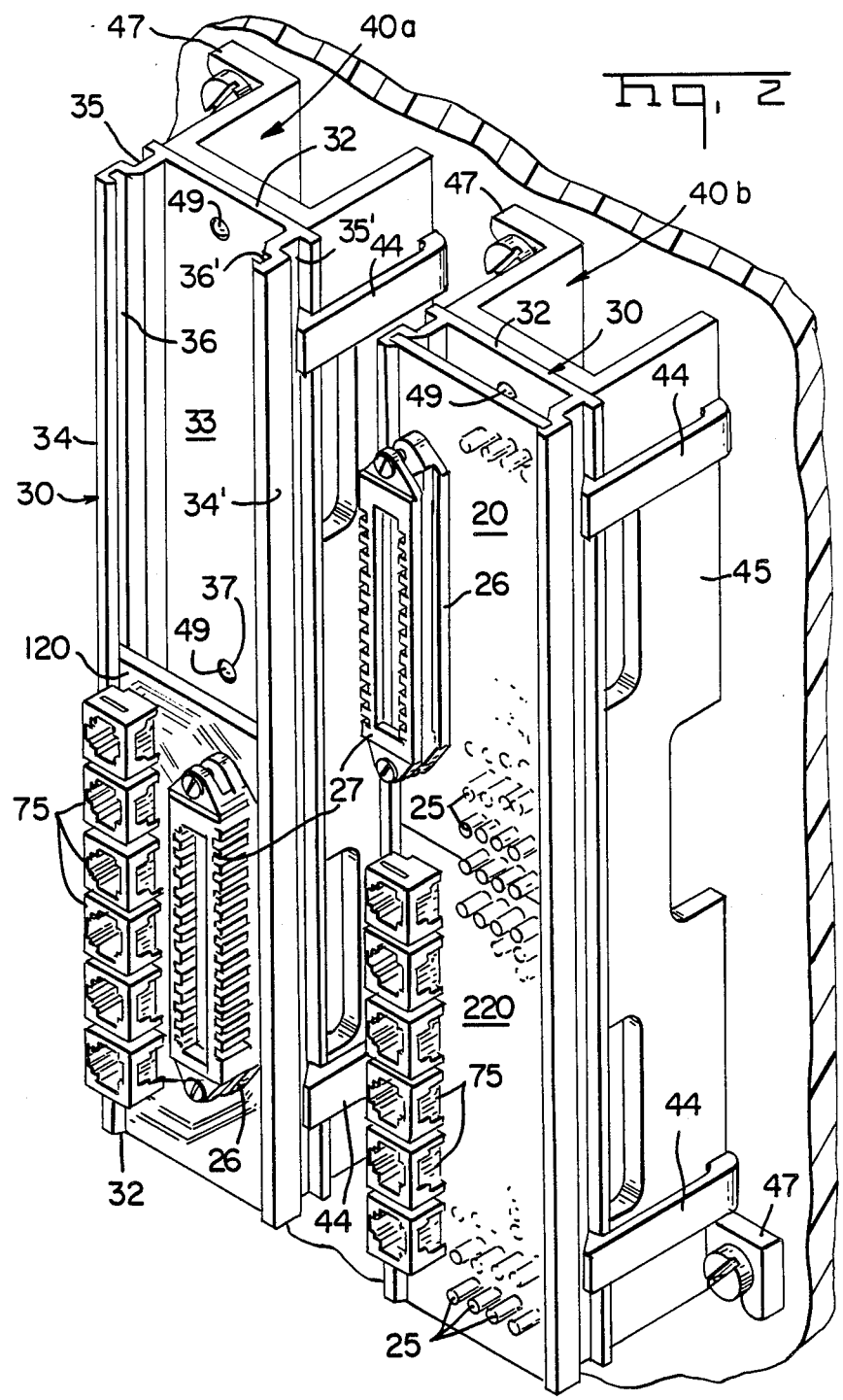

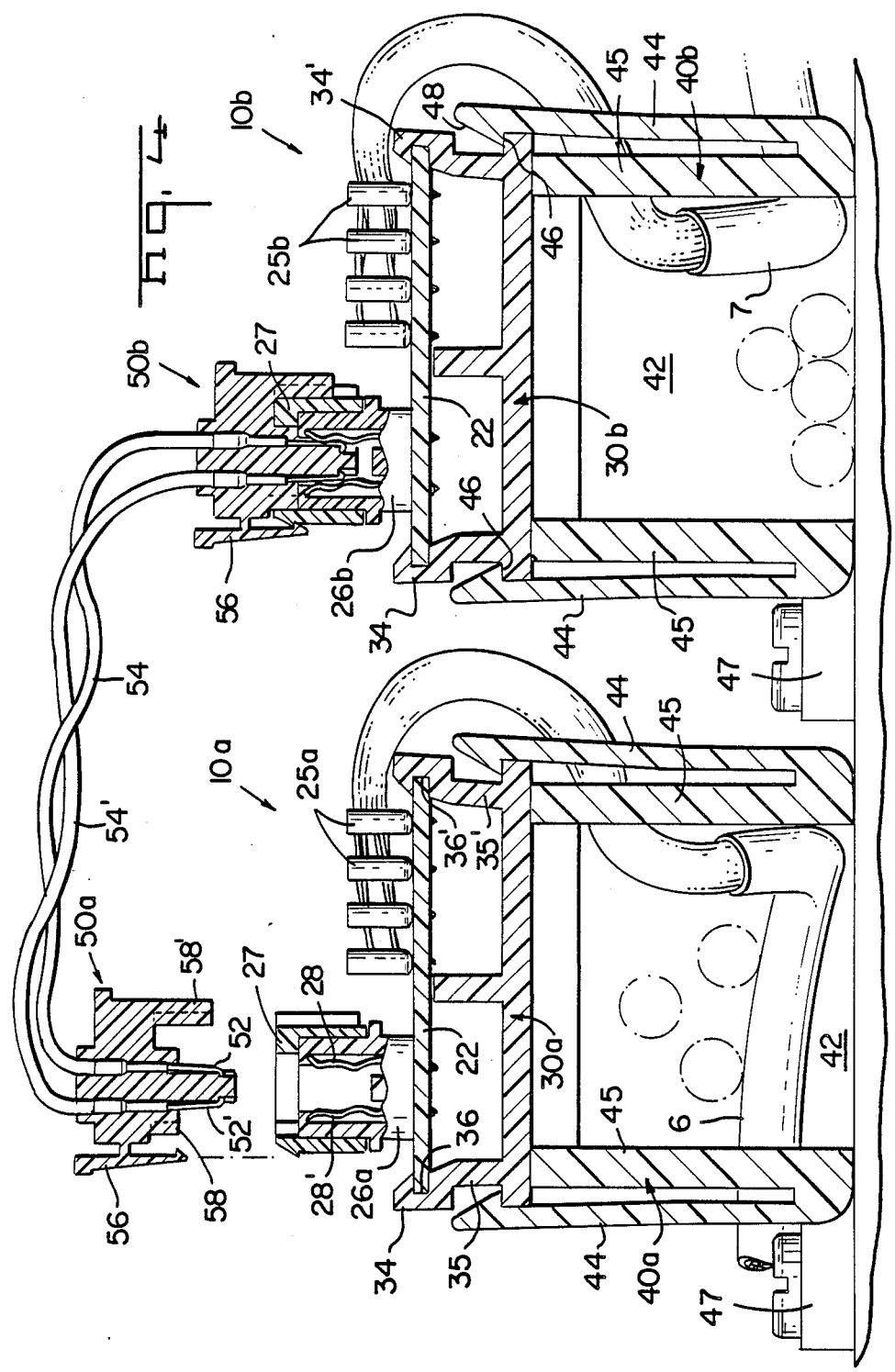

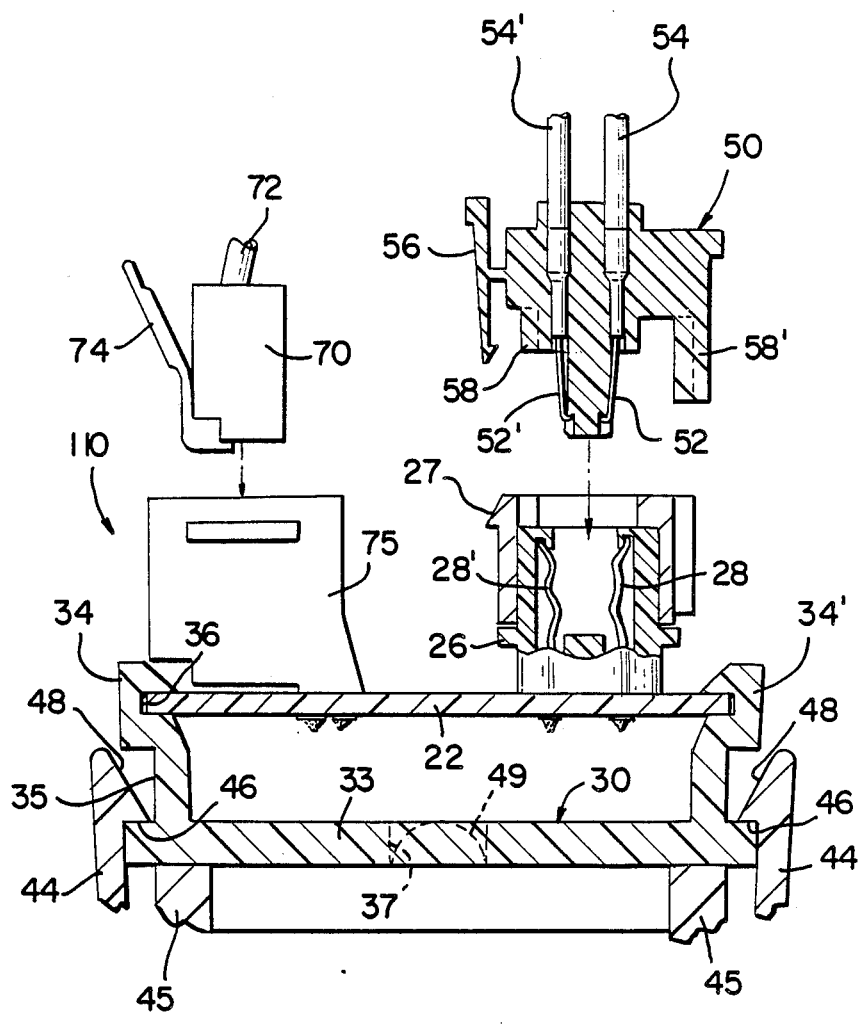

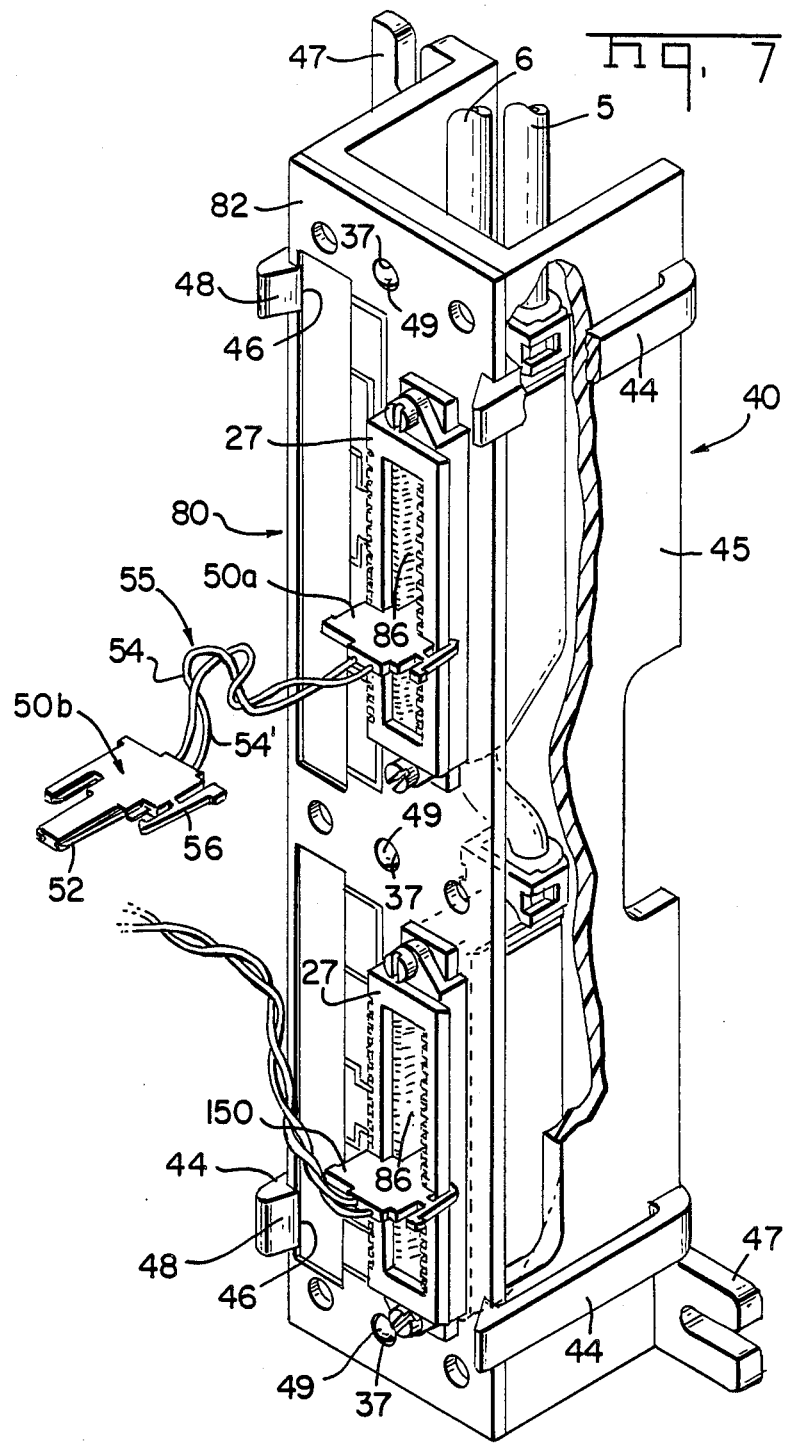

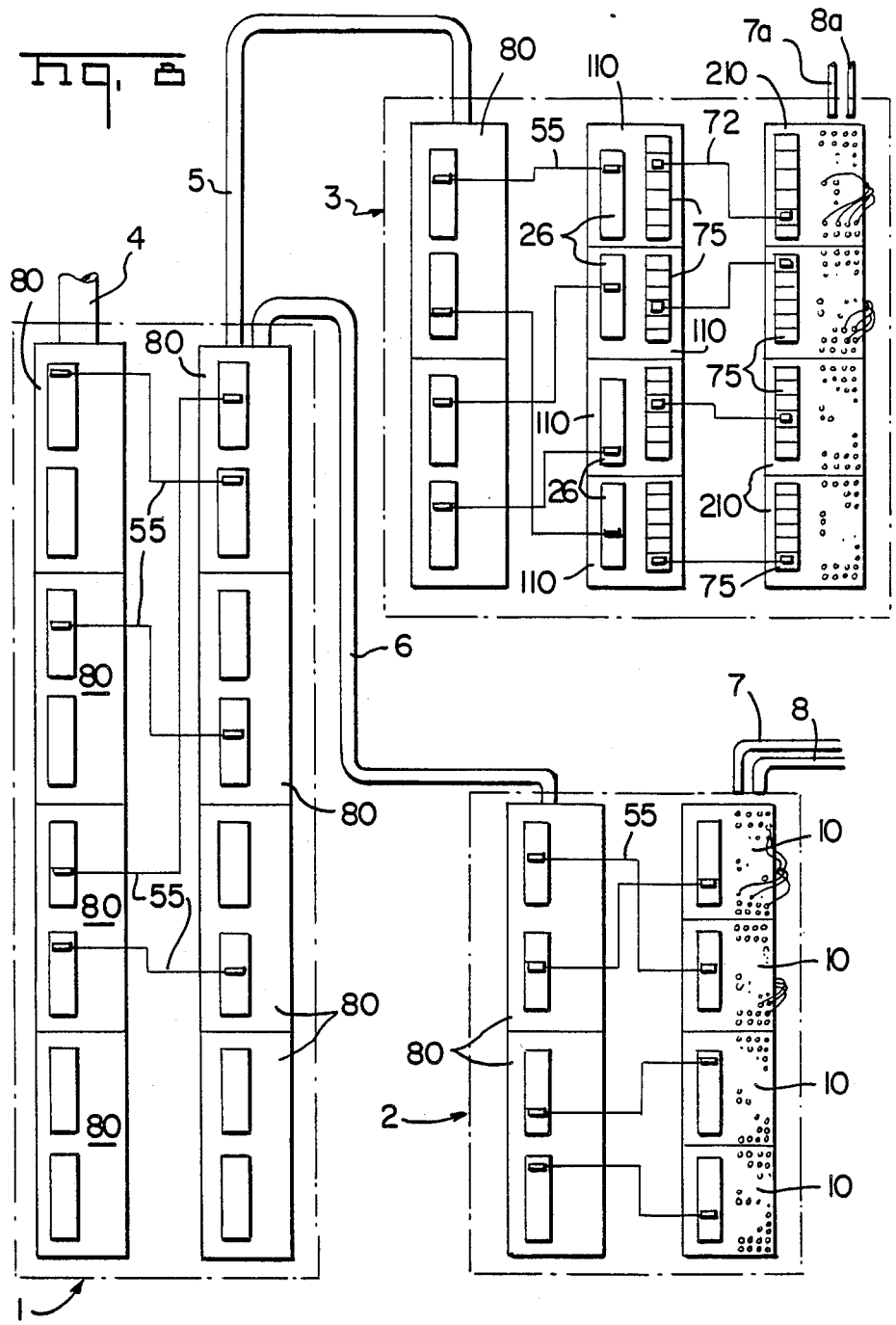

PREMISE DISTRIBUTION CROSS CONNECT APPARATUS

This application is a continuation of application Ser. No. 881,534, filed July 2, 1986, now abandoned.

BACKGROUND OF THE INVENTION

1. Field of the Invention

This invention relates to electrical distribution systems used primarily in buildings and specifically to telephone and data communications distribution systems.

2. Description of the Prior Art

Electrical systems, such as telecommunications distribution systems used in large buildings, must provide some means to properly distribute incoming circuits to the proper location within a building. A practical premise distribution system must have both the capability of distributing large number of circuits and the capability of being reconfigured as circumstances may subsequently require. For example, a telephone distribution system must permit easy relocation and redistribution of telecommunications equipment and circuit assignments.

For large office buildings, a central distribution assembly is generally provided. In conventional telecommunication systems, multiconductor cables normally comprise the incoming circuitry at the building entrance location and 25 pair cables or larger serve as riser cables normally extending between the building entrance, or primary closet, and other distributed locations or satellite closets. Cross connect capability is necessary in both the primary closet and the satellite closets. For telecommunications equipment, this cross connect capability means that one or more pairs in the outgoing cable or conductors must be selectively connected to a corresponding number of pairs in the incoming cables. Since the cross connect capability is intended to permit selectablity between incoming and outgoing pairs, the cross connect means must be suitable for providing interconnection for any single pair or group of pairs in the outgoing cable to any single pair or group of pairs in the incoming cable.

A conventional apparatus for achieving such cross connect capability would include a wiring block assembly and a connecting block assembly. Generally, conductors in a plurality of incoming or outgoing cables would be deployed and attached or terminated in a plurality of rows on a wiring block apparatus mounted in either the primary closet or the satellite closet. A separate wiring block would be provided for the incoming cable, and another wiring block would be provided for the outgoing cable. Cross connect capability would be provided by use of jumper assemblies consisting of connector blocks attached at opposite ends of one or a group of jumper wire pairs. One jumper cable connector could be connected to prescribed adjacent pairs on the incoming wiring block and a second connector block attached to the other end of the jumper wire would be similarly connected at the desired location in the outgoing wiring block. Conversely, simple jumper wires, which could be terminated to insulation displacement type terminals in the incoming and outgoing wiring blocks could be employed by the jumper.

One example of this latter type of cross connect assembly is the 66 connecting block system manufactured by AT&T. These 66 type blocks employ quick clip or insulation displacement terminals for interconnection to a wire. These 66 type blocks are generally mounted on a bracket which defines a trough between the face of the bracket and the wall or panel on which the bracket is mounted. Cables are routed in the trough and around on the exterior to deploy the individual wires for termination into the clip type contacts in the 66 block. Resilient latches extend from the sides of these mounting brackets to engage the base of conventional 66 type mounting blocks. One bracket of this type is referred to an 89 type mounting bracket and is manufactured by Western Electric. Since these 66 type blocks and 89 type brackets have been in wide use for a number of years, a number of installations employ these conventional 89 type brackets for wire management purposes. However, the 66 blocks do have certain disadvantages in terms of facilitating quick and easy repositioning of the jumpers.

Although many cross connect systems do employ cross connect blocks in which the wires in a multiconductor cable are attached directly to the wiring block or cross connect block, some conventional cross connect systems employ connectorized cable systems in which miniature ribbon connectors are used to interconnect the cross connect apparatus to connectorized cables. Miniature ribbon connectors consist of connectors having a plurality of terminals side by side in two rows. Since these connectors are generally used with cables having a plurality of associated wire pairs, terminals in corresponding positions within the same row would be attached to the wires corresponding a particular pair. Male and female connectors could then be intermated to join the miniature ribbon connector attached to a cable to a separate miniature ribbon connector, in turn attached to cross connect terminals by wires or other means. In some assemblies, the conventional wiring blocks are factory assembled with wires leading from corresponding positions on the wiring block to the appropriate position on the associated miniature ribbon connector.

U.S. Pat. No. 4,662,701, discloses a cross connect system which employs miniature ribbon connectors without the need of separate cross connect terminal assemblies. This patent application discloses a single pair interconnect system in which the jumper plugs mount directly with the terminals on a female miniature ribbon connector. That invention, however, only provides interconnection between two identical ribbon connectors. A true cross connect system would require interconnection not only between miniature ribbon connectors but also interconnection to work stations and telecommunications equipment which may employ cables which normally cannot be terminated by a miniature ribbon connector. The preferred embodiment of the invention disclosed herein provides a means for utilizing this single pair cross connect capability not only with connectorized cable but also with discrete wires, cables having a smaller number of conductors, and with connectors such as modular telephone jacks. Furthermore, the preferred embodiment of this invention provides a system which can be used in much the same manner as conventional cross connect systems but which will reduce the number of components employed in the cross connect system and will reduce the amount of labor necessary to install and maintain such systems. Furthermore, the preferred embodiment of this invention is specifically adapted for use with wire management hardware such as 89 type mounting brackets which are already in place in a number of buildings.

Therefore, the preferred embodiment of this invention is suitable not only for new installations but for replacement of and updating existing cross connect systems which have neither the flexibility or capacity of the apparatus disclosed and claimed herein.

SUMMARY OF THE INVENTION

This invention relates to an interconnection module for use in a premise distribution system for selectively joining communications equipment throughout a building to incoming communications circuits. A number of interconnection modules would be used in a single premise distribution system. Each interconnection module consists of two conductor termination elements mounted on a single printed circuit board. The printed circuit board includes traces to interconnect corresponding terminals in the cross connect member and the circuit interconnection member. The cross connect member and the circuit interconnection member joined by common traces on a printed circuit board can comprise a printed circuit board mounted miniature ribbon connector and a cylindrical insulation displacement barrel terminal array. Other conventional connector devices which may be employed include a vertical mount modular telephone jack. The printed circuit board is mounted on a mounting plate having a pair of opposed sidewalls each having an inwardly facing groove. Thus, the printed circuit board can be inserted into the grooves in the mounting plate, and the mounting plate can be secured to a conventional 89 type mounting bracket. A plurality of the printed circuit board interconnect modules can then be positioned side by side, and single line assignment jumpers can be used to interconnect associated positions on the separate printed circuit boards.

BRIEF DESCRIPTION OF THE DRAWINGS

FIG. 2 shows a pair of interconnection modules secured to a conventional mounting bracket and shows the manner in which a plurality of printed circuit boards can be employed in each interconnection module.

FIG. 3 shows a single printed circuit board having a miniature ribbon connector cross connect member and a plurality of insulation displacement barrel terminal circuit interconnection members.

FIG. 4 shows the manner in which a single jumper cable assembly can be used to interconnect associated terminal pairs in separate miniature ribbon cross connect members in two circuit interconnection modules secured to incoming and outgoing cables.

FIG. 5 shows another interconnection module employing a miniature ribbon connector cross connect member and a vertical entry modular telephone jack circuit interconnection member.

FIGS. 8 and 9 are diagramatic representations of cross connect systems employing interconnection modules disclosed herein as employed in primary closets and a plurality of satellite closets.

DETAILED DESCRIPTION OF THE PREFERRED EMBODIMENTS

Figure 1:
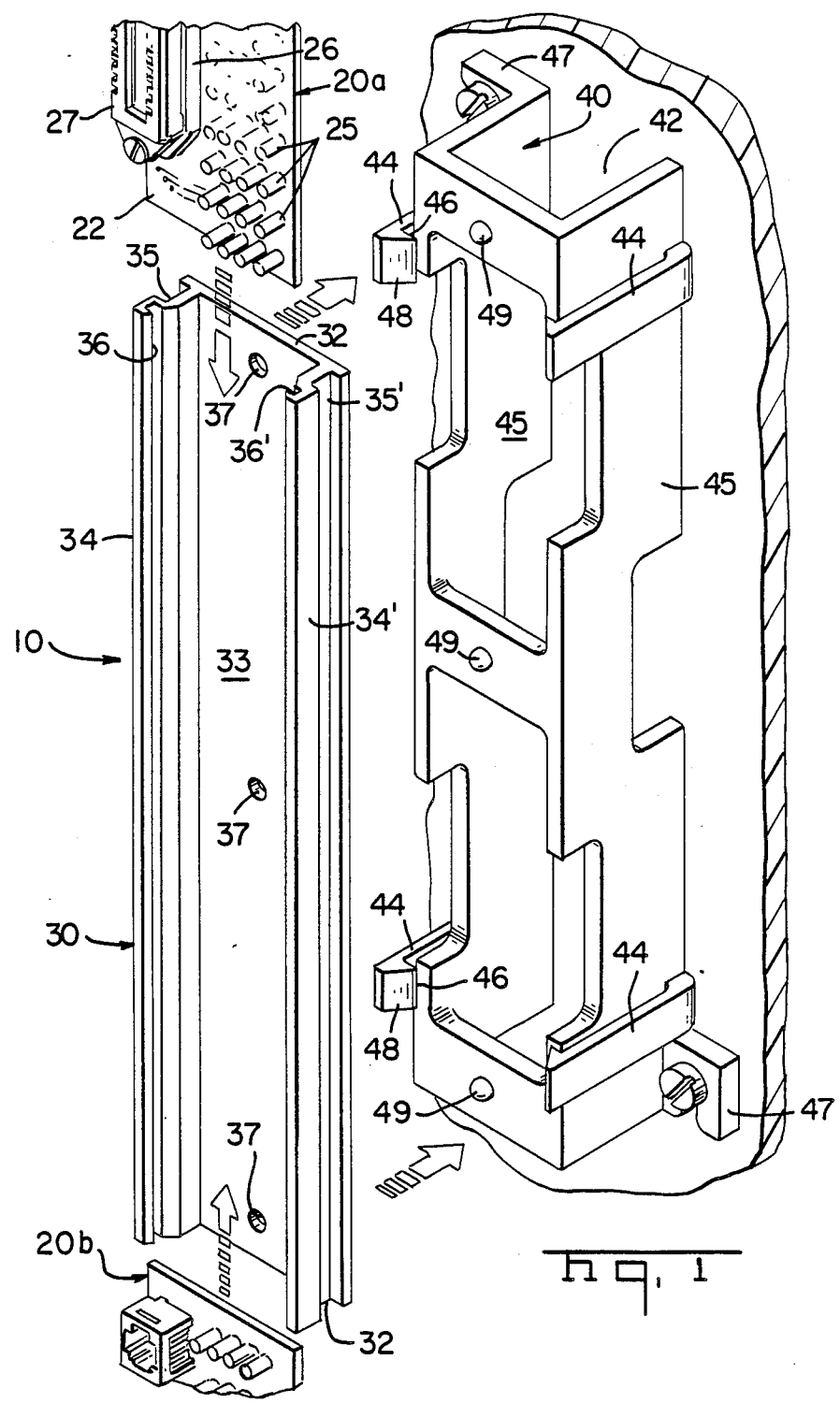
FIG. 1 is a view showing the manner in which an interconnection module can be field assembled and secured to a conventional mounting bracket.

FIG. 1 demonstrates the ease in which an interconnection module 10, in accordance with the preferred embodiment of this invention, can be assembled to a conventional mounting bracket 40 such as a conventional 89B cross connect mounting bracket manufactured for a number of years by Western Electric. The interconnection module 10 shown in FIG. 1 consists of a mounting plate 30 and one or more printed circuit board subassemblies 20a and 20b. Each of the printed circuit board subassemblies 20a and 20b shown in FIG. 1 consists of a conventional printed circuti board mounted miniature ribbon connector 26 mounted to the printed circuit board with a line adapter bracket 27 secured to the miniature ribbon connector. A single pair line assignment adapter bracket 27 of the type employed herein which is engagable with the mating recess of a miniature ribbon connector is described in more detail in U.S. Pat. No. 4,662,701, incorporated herein by reference.

Each printed circuit board subassembly 20 also includes an array of insulation displacement barrel terminals 25. Barrel terminals suitable for use in the preferred embodiment of this invention generally have an insulation displacement slot extending along the cylindrical barrel in the direction of the axis of the barrel. Each individual barrel terminal 25 depicted herein is suitable for mounting in the printed circuit board in engagement with a corresponding trace on the printed circuit board. Barrel terminals of the type employed in the preferred embodiment of this invention are disclosed in more detail in U.S. Pat. No. 4,141,618, incorporated herein by reference. An insertion cover suitable for use with an insulation displacement barrel terminal 25 is disclosed in greater detail in U.S. Pat. No. 4,186,984, also incorporated herein by reference.

Interconnection module 10 also includes a mounting plate 30 comprising a backwall and integral opposite sidewalls 34 and 34' extending from the backwall 33. Each sidewall 34 and 34' has an inwardly facing slot 36 and 36' adjacent the outer edge. Each slot 36 extends from at least one open end 32 of the mounting plate 30. A pair of outwardly facing channels 35 and 35' are located on the opposite face of the sidewalls 34 and 34' adjacent the backwall 33. In the preferred embodiment of the mounting plate 30, a plurality of holes 37 extend through the backwall 33. The inwardly facing opposed grooves 36 and 36' in spaced apart sidewalls 34 and 34' are dimensioned for receipt of the printed circuit board 22. As shown in FIG. 1, printed circuit boards may be inserted into the mounting plate 30 from an open end 32 with the opposed edges of the printed circuit board fitting within the grooves 36, 36'. The preferred embodiment of the mounting plate 30 shown in FIG. 1 has grooves which are open at both ends, thus permitting insertion of printed circuit board subassemblies 20a, 20b from either end.

The mounting bracket 40 shown in FIG. 1 comprises a prior art mounting bracket commonly referred to as the 89B mounting bracket manufactured by Western Electric. Mounting bracket 40 comprises a unitary member molded from a plastic material having opposite sidewalls 45 which define a longitudinally extending trough 42 between sidewalls 45 and a structure, such as a panel or wall, to which the mounting bracket is secured by mounting ears 47. A plurality of resilient latches 44 extend along the exterior of the sidewalls 45 adjacent opposite ends of the mounting bracket 40. Each resilient latch 44 has an inwardly facing latching shoulder 46 adjacent its free end. Shoulder 46 merges with an inclined camming shoulder 48 on the inward face of each resilient latch 44. As shown in FIG. 1, mounting plate 30 can be attached to mounting bracket 40 merely by deflecting the resilient latches 44 upon engagement of the outer edges of backwall 33 with the camming surfaces 48. Latching shoulders 46 are free to engage the backwall 33 in channels 35, 35' in the manner shown in FIGS. 4–6. The aligning holes 37 in the backwall of mounting plate 30 receive projections 49 to precisely position the mounting plate 30 with respect to bracket 40. The individual printed circuit board subassemblies 20a and 20b may be inserted into the grooves 36 and 36' of mounting bracket 30 independently of attachment of the mounting plate 30 to the mounting bracket 40. Therefore, the printed circuit board subassemblies 20a and 20b can be inserted either before or after assembly of the mounting plate 30 to mounting bracket 40. Thus printed circuit board subassemblies 20a and 20b can be easily replaced by simply sliding a given printed circuit board subassembly out of the grooves 36 and 36' on an open end 32 of the mounting plate 30.

FIG. 2 shows an example of the manner in which individual circuit board subassemblies can be positioned on mounting brackets 40 using mounting plates 30. FIG. 2 shows three separate printed circuit board subassemblies 20, 120, and 220 each consisting of a different combination of cross connect members and circuit interconnection members. Printed circuit board 20 includes barrel terminal circuit interconnection members 25 and a miniature ribbon connector cross connect member 26. Printed circuit board subassembly 120 includes vertical entry modular telephone jacks 75 as a circuit interconnection means and miniature ribbon connectors as the cross connect means. The printed circuit board subassembly 220 includes barrel terminals 25 and modular telephone jacks 75. Either the barrel terminals or the modular telephone jacks can serve as cross connect means or circuit interconnection means. FIG. 2 illustrates the versatility of the interconnection module cross connect approach. However, FIG. 2 is only intended to be illustrative, and the precise assembly of side by side brackets 40a and 40b containing the interconnection modules shown in FIG. 2 might not be used in practice. Indeed, many practical cross connect systems would employ the same type of interconnection modules in both mounting brackets 40a and 40b.

FIG. 3 shows the peferred embodiment of the printed circuit board subassembly 20. This subassembly is particularly adapted for use with a 50 cable wire cable commonly used in the telecommunications industry. These cables normally employ twisted pair wires, and each cable is normally referred to as a 25 pair cable. The miniature ribbon connector 26 is a conventional printed circuit board mounted 25 pair miniature ribbon connector. Terminals located in opposed rows in a mating recess on the connector are connected to the printed circuit board on the opposite end in a conventional fashion. A line assignment adapter bracket 27 is mounted on the mating end of miniature ribbon connector 26 by means of conventional hold down screws. The bracket 27 is generally rectangular and has an annular construction, such that the center of bracket 27 is open and is positioned in alignment with the mating recess of the miniature ribbon connector 26. A plurality of grooves are located along the opposite sides of the line assignment adapter bracket 27. Each groove is in alignment with a corresponding terminal in the miniature ribbon connector. The barrel terminals 25 are located along the opposite side of the printed circuit board 22 and are of conventional construction. Each barrel terminal has an insulation displacement wire receiving slot which extends perpendicular to the plane of the printed circuit board so that a wire can be inserted into electrical engagement with the barrel terminals 25 by moving the wire laterally of its axis into the slot toward the printed circuit board 22. Each barrel terminal 25 is interconnected to a corresponding terminal in the miniature ribbon connector by means of printed circuit board traces 24. These printed circuit board traces can advantageously be located on opposite surfaces of the printed circuit board and interconnection between a trace on one side with the trace on the other side can made by vias 23 in a conventional manner. The individual barrel terminals 25 are free standing contact elements located along one of two opposed edges of printed circuit board 22 in a position to act as circuit interconnection means. The miniature ribbon connector 26 has a plurality of terminal pairs in which each terminal of the pair is located on an opposite side of the mating recess of the miniature ribbon connector. As will be described in greater detail hereinafter, the miniature ribbon connector serves as an excellent cross connect means because individual terminal pairs in one miniature ribbon connector can be selectively interconnected with individual terminal pairs in a similar miniature ribbon connector in another interconnection module. The barrel contact elements 25 serve as an excellent circuit interconnection means since interconnection can be made to individual insulated wires without requiring the wires to be stripped. The barrel terminals also permit the circuit integrity to be tested since these free standing contact elements are exposed and would permit use of a probe to check circuit continuity.

FIG. 4 illustrates both the cross connect capability and the circuit interconnection capability of the preferred embodiment of this invention. The interconnection modules 10a and 10b are mounted in side by side mounting brackets 40a and 40b of conventional construction. The circuit interconnection barrel terminal contact elements 25a and 25b are interconnected to the individual insulated wires of both an incoming feed cable 6 and outgoing cable 7. These cables, along with other similar cables, extend through the trough 42 on the underside of the brackets 40 with the individual conductors being laced around the side of brackets 40a and 40b where an insulation displacement interconnection can be established with the barrel terminal contact elements 25a and 25b. FIG. 4 also shows the single position jumper plug assemblies which are used with miniature ribbon connectors 26a and 26b to establish the desired selective cross connect capability. These jumper plugs 50a, 50b are described in more detail in U.S. Pat. No. 4,662,701. These plugs 50a and 50b are adapted for interconnection to a single terminal pair in each miniature ribbon connector. Two contact members 52 and 52' are on opposite sides of a central rib of the jumper and are formed of a springy round wire. Thin blade sections 58 and 58' which form tongues on opposite sides of the central contacts 52 and 52' are positioned for insertion into the grooves formed on the line assignment adapter 27. Latch 56 holds an individual jumper plug 50a in engagement with the line assignment adapter 27. Jumper wires 54 and 54' attached respectively to terminals 52 and 52' extend between two identical jumper plugs 50a and 50b. By positioning interconnection modules side by side, an individual jumper plug assembly consisting of jumper plugs 50a and 50b and intervening twisted pair wires 54 and 54' can be selectively positioned in engagement with any of the 25 terminal pairs in a conventional 25 position miniature ribbon connector. Since each of these jumper plugs is specifically adapted to interconnect only a single pair of miniature ribbon connector terminals, and since two jumper plugs can be positioned side by side in engagement with adjacent miniature ribbon connector terminals, any combination of terminals in the two miniature ribbon connectors can be interconnected. Indeed, no practical reason exists why connections cannot be made between the terminals in one miniature ribbon connector to selected terminals in several different miniature ribbbon connectors comprising the cross connect elements.

FIG. 4 also demonstrates how the interconnection modules are affixed to a conventional bracket 40a and 40b. Mounting plates 30a and 30b are secured to brackets 40a and 40b respectively with the resilient latches 44 inserted within the outwardly facing grooves 35 and 35'. The printed circuit boards 22 are in turn fitted within the grooves 36 and 36'.

FIG. 5 shows an interconnection module 110 which is an alternate embodiment of interconnection module 10. Interconnect module 110 in FIG. 5 employs a conventional vertical entry modular telephone jack 75 as a circuit interconnection member. The vertical entry modular telephone jack 75 is of the type described in U.S. Pat. No. 4,296,991, incorporated herein by reference. The interface of modular telephone jack 75 is suitable for receipt of a companion modular telephone plug 70 attached to a multiconductor cable 72. Latching member 74 engages the modular telephone jack 75 in a conventional manner. Printed circuit board mounted modular telephone jack 75 is interconnected by printed circuit board traces to corresponding terminals 28 and 28' in the miniature ribbon connector 26. The interconnection module 110 would employ a number of modular telephone jacks 75 for interconnection to circuits represented by cable 72. Modular telephone jacks of this type are commonly available in 4-position, 6-position, and 8-position sizes. Interconnection module 110 not only has the cross connect capabilities of the single line jumper plug 50 combined with the line assignment adapter 27 mounted on the miniature ribbon connector 26, but permits reassignment of equipment interconnected to cable 72 merely by repositioning the modular telephone plugs.

Figure 6:
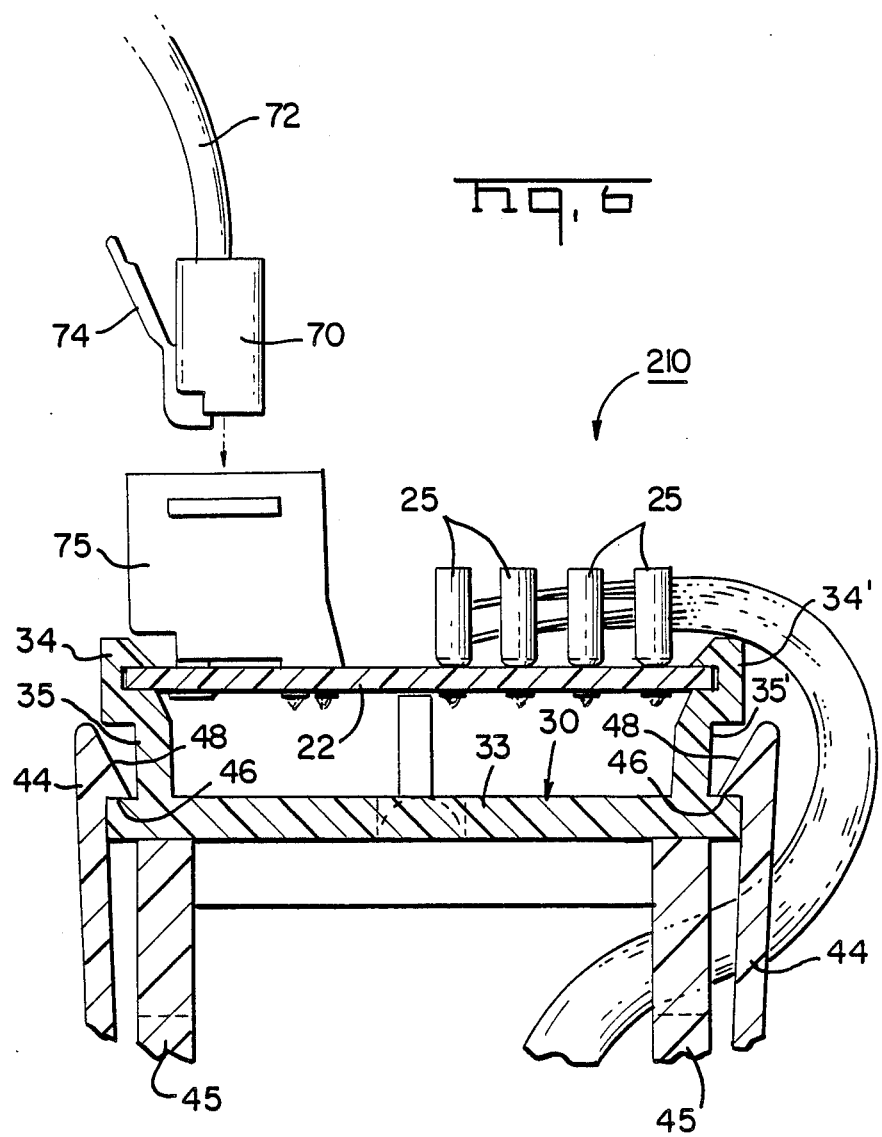
FIG. 6 shows an interconnection module having a modular telephone jack cross connect member and a insulation displacement barrel terminal array circuit interconnection assembly.

FIG. 6 discloses another embodiment of an interconnection module 210. The embodiment of FIG. 6 employs the barrel terminal contact elements 25 as the circuit interconnection means and the modular telephone jack 75 as a cross connect means. This embodiment is especially adapted for those configurations in which single line assignment cross connect is not required.

Figure 7:
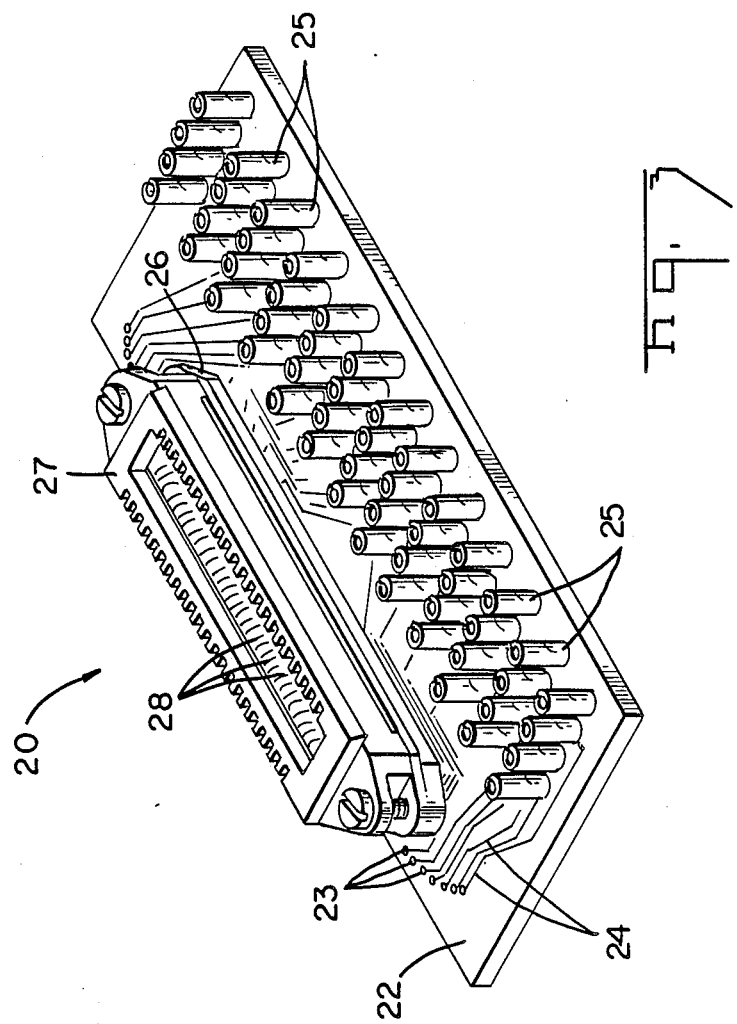
FIG. 7 shows an assembly which can be used to interconnect incoming to outgoing multiconductor cables.

FIG. 7 discloses another module 80 which is suitable for use with the various interconnection modules previously discussed to form a complete cross connect system. This module 80 includes cable mounted miniature ribbon connectors 86 attached to incoming or outgoing 25 pair cables 5 and 6. These connectors are described in U.S. patent application Ser. No. 729,824 filed May 2, 1985 previously incorporated herein by reference. Each connector 86 is attached to a single cable. The single line assignment jumper plug assembly consisting of plugs 50a and 50b interconnected by twisted wire pairs 54 and 54' to interconnect incoming and outgoing cables. This module is described in more detail in U.S. patent application Ser. No. 729,824, filed May 2, 1985, previously incorporated herein by reference. Interconnection module 80 permits selective interconnection between conductor pairs in incoming cables and outgoing cables.

Figure 9:
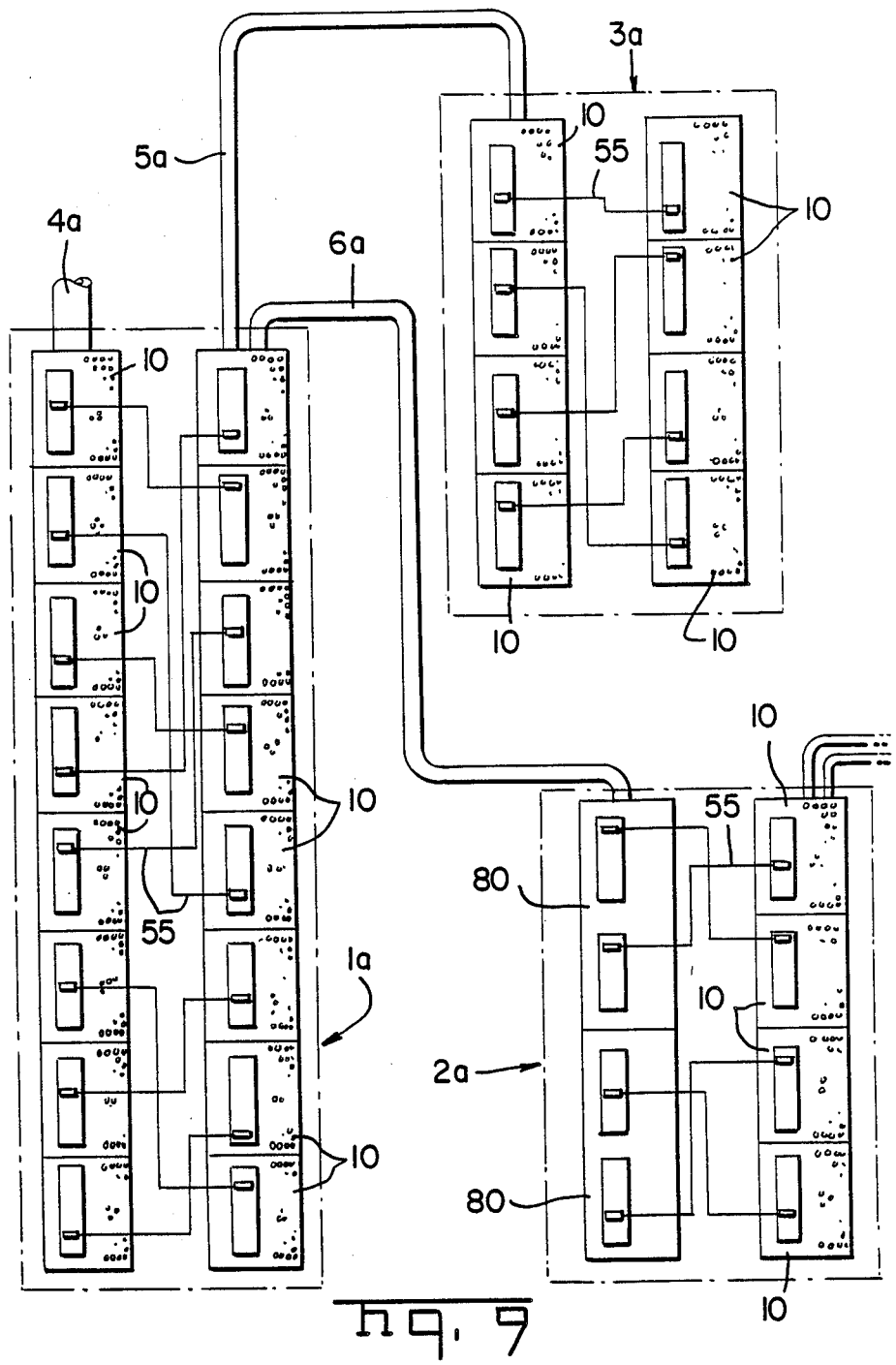

FIGS. 8 and 9 are diagramatic views showing the manner in which the interconnection modules depicted herein can be used to form a premise distribution system suitable for use in a large building. As depicted in FIGS. 8 and 9, this premise distribution system is especially useful for interconnecting telecommunications equipment with outgoing cables. FIG. 8 discloses three stations in a primary distribution system. A primary closet 1 would comprise the entrance location for a number of incoming communication circuits or cables. Incoming cables 4 are attached to miniature ribbon connectors 80 of the type shown in FIG. 7. Similar interconnection modules 80 are attached to outgoing or riser cables 5 and 6. For instance, an incoming cable having 200 pairs of conductors can be selectively indicated to 2 riser cables 5 and 6, each containing 100 wire pairs. FIG. 7 is representative and shows several single line jumper assemblies 55 for selectively interconnecting only certain pairs in the incoming cable 4 to pairs in the outgoing riser cables 5 and 6. It should be understood that all circuits, or only a portion of the circuits, can be selectively cross connected in this manner.

Cables 5 and 6 lead from the primary closet location 1 to satellite closets 2 and 3 remotely located within a building. At the satellite location 2, interconnection modules 80, similar to those used in the primary location, are attached to the riser cable 6. Interconnection modules 10 each including miniature ribbon connectors and barrel contact elements are employed with outgoing conductors. These outgoing conductors are shown in the form of cable 7 and 8 in the embodiment of FIG. 8.

Another satellite closet 3 also incorporates interconnection modules 80. As shown in satellite closet 3, modules 80 are cross connected with modules 110 consisting of a modular telephone jack and a miniature ribbon connector. Single pair jumper assemblies 55 are used for selectively programming ribbon connectors in the manner previously described. A bank of modular telephone connectors are interconnected by a cable 72 to similar modular telephone jacks in a module 210. Conductors 7a and 8a are in turn attached to the barrel terminal contact elements in module 210. Conductors 7 and 8 in satellite closet 2 and conductors 7a and 8a in satellite closet 3 then lead to telecommunications equipment located in the vicinity of the satellite closets. Note that selective cross connect capability is present in the primary closet and in the satellite closets. Furthermore, either single line cross connect capability using a single line jumper plug assembly 55 or multiwire cross connect capability using telephone modular plugs 72 are suitable for use in this cross connect system.

FIG. 9 shows another premise distribution system employing the interconnection modules described herein which might prove suitable for use in a particular facility. Primary closet 1a employs a plurality of interconnection modules 10 consisting of barrel contact circuit means and miniature ribbon connector cross connect means to interconnect incoming cables 4a to outgoing riser cables 5a and 6a. Satellite closet 2 uses one array of interconnection modules 80 and a separate array of interconnection modules 10 in the same manner as satellite closet 2a in FIG. 8. Satellite closet 3a employs only interconnection modules 10 similar to the primary closet 1a. In any event, FIGS. 8 and 9 show that a number of different combinations of interconnection modules can be employed in both a primary and secondary location. For example, the use of interconnection modules 10 permit circuit continuity checks to the free standing barrel terminals. Miniature ribbon connectors provide a simple single line cross connect capability in a connectorized cable assembly. Interconnection modules 210 permit simple changes to be made by repositioning modular telephone plug cable. Furthermore, this invention is suitable for use in transmitting either voice or data. It will be apparent to those skilled in the art that other embodiments of the interconnection modules can be used to form a premise distribution system of the type to which the following claims are directed.

We claim:

1. A premise distribution system for selectively interconnecting incoming circuits to distributed telecommunications equipment in a building, the system including a plurality of cross connect stations, each cross connect station including an incoming interconnection module and an outgoing interconnection module, each module being physically separate from the other module, and at least one single conductor pair jumper, each module having first conductor termination means mounted on a panel, the first conductor termination means comprising means having a plurality of terminals positioned in pairs, each conductor pair individually selectively interconnectable to one single pair jumper, a first of the interconnection modules including only first termination means, a second of the interconnection modules comprising a printed circuit board having first and second conductor termination means mounted thereon, the second conductor termination means comprising means for interconnecting a plurality of conductors to the module in a manner different from the first conductor termination means, corresponding positions in the first and second conductor termination means being interconnected by printed circuit board traces, and means for positioning the panels of the separate incoming and outgoing modules side-by-side so that conductor pairs in the first conductor termination means of the incoming module can be alternatively selectively interconnected to first conductor termination means of the outgoing module by a single pair jumper extending therebetween.

2. The premise distribution system of claim 1 wherein the first conductor termination means comprises at least one miniature ribbon connector having a plurality of terminals arranged in two parallel rows on opposite sides of a mating recess.

3. The premise distribution system of claim 2 wherein each miniature ribbon connector on the first interconnection module includes terminals having means for interconnection to wires in a multiconductor cable and each miniature ribbon connector in the second interconnection module includes terminals having means for interconnection to printed circuit board traces.

4. A premise distribution system for selectively interconnecting incoming circuits to distributed telecommunications equipment in a building, the system including a plurality of cross connect stations and at least one single conductor pair jumper, each cross connect station including an incoming printed circuit board interconnection module and an outgoing printed circuit board interconnection module, each module being physically separate from the other module, each module having first and second conductor termination means, the first conductor termination means having a plurality of terminals positioned in pairs, each conductor pair individually selectively interconnectable to one single pair jumper, the second conductor termination means comprising means for interconnecting a plurality of conductors to the module, each printed circuit board interconnection module having terminals on one face of the printed circuit board in the first and second conductor termination means, corresponding terminals in the first and second conductor termination means being interconnected by printed circuit board traces, and means for positioning the incoming and outgoing printed circuit board modules side-by-side so that conductor pairs in the first conductor termination means of the incoming module can be alternatively selectively interconnected to first conductor termination means of the outgoing module by a single pair jumper extending therebetween.

5. The premise distribution system of claim 4 wherein the positioning means comprises mounting plate means having pairs of side-by-side parallel grooves, the grooves comprising each pair being spaced apart and opposed for receiving a printed circuit board therein.

6. The premise distribution system of claim 5 wherein the mounting plate means comprises a plurality of mounting plates, each mounting plate having a pair of outwardly facing channels, each channel comprising means for removably receiving resilient latches on brackets permanently mounted at prescribed locations within the building.

7. The premise distribution system of claim 4 wherein the first interconnection means comprises a miniature ribbon connector having a plurality of terminals arranged in two parallel rows on opposite sides of a mating recess, the terminals being in contact with the printed circuit board traces.

* * * * *